Sept. 12, 1950        J. R. SCHAFFER        2,522,135

RUBBER-TO-METAL ADHESION

Filed Aug. 30, 1945

FIG. 1

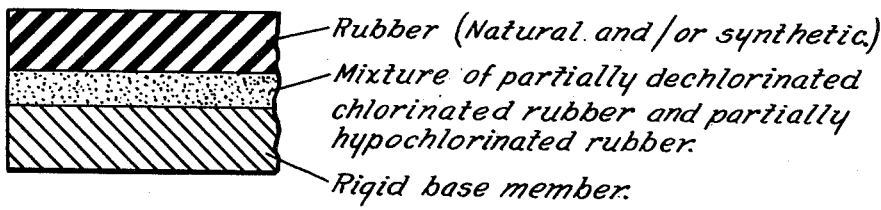

- Rubber (Natural and/or synthetic.)
- Mixture of partially dechlorinated chlorinated rubber and partially hypochlorinated rubber.
- Rigid base member.

FIG. 2

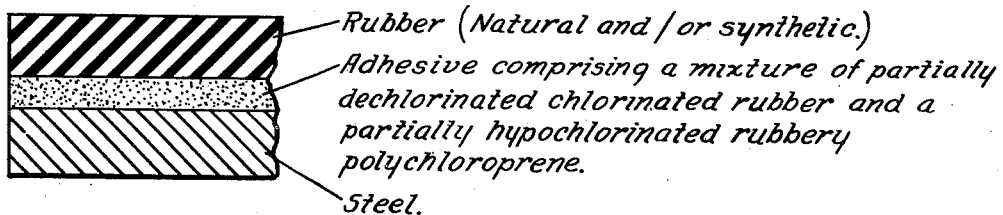

- Rubber (Natural and/or synthetic.)
- Adhesive comprising a mixture of partially dechlorinated chlorinated rubber and a partially hypochlorinated rubbery polychloroprene.
- Steel.

FIG. 3

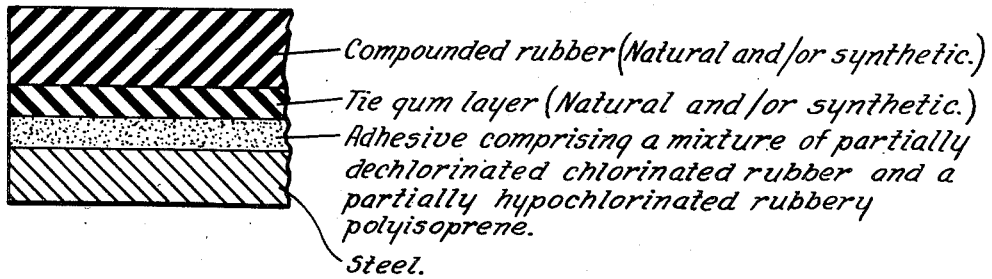

- Compounded rubber (Natural and/or synthetic.)
- Tie gum layer (Natural and/or synthetic.)
- Adhesive comprising a mixture of partially dechlorinated chlorinated rubber and a partially hypochlorinated rubbery polyisoprene.
- Steel.

Inventor
James R. Schaffer
By Robert W. Furlong
Atty.

Patented Sept. 12, 1950

2,522,135

UNITED STATES PATENT OFFICE 2,522,135

RUBBER-TO-METAL ADHESION

James R. Schaffer, Akron, Ohio, assignor to The B. F. Goodrich Company, New York, N. Y., a corporation of New York Application August 30, 1945, Serial No. 613,709

17 Claims. (Cl. 154—130)

This invention relates to the uniting of rubber and the like to metallic and similar surfaces and particularly to an adhesive cement for that purpose.

There are many known methods of uniting rubber and the like to metallic surfaces. One of the best known methods of rubber to metal adhesion involves coating the metal surface with brass plating, applying a coating of rubber cement to the brass plating and vulcanizing the rubber in contact with the cement coating. This method is not entirely satisfactory because of the expensive time consuming brass plating operation involved. Another known method is to coat the metallic surface with an adhesive composition comprising a cement of resin-like or cyclicized rubber derivatives and vulcanize the rubber layer to the cement layer with an intervening layer of tie-gum rubber. This method is not entirely satisfactory because the coating of the brittle rubber derivative is weaker than the adhered rubber compound and the rubber to metal bond is not strong enough to resist conditions of shock or impact. Still other methods possess serious drawbacks such as limitations on the types of rubber capable of being adhered, spotty and unreliable adhesion, difficulty of control, health and safety hazards in their use, and an undesirable multiplicity of operations.

It is an object of this invention therefore to provide a method uniting rubber and the like to metallic surfaces which will be economical and produce superior and more reliable rubber to metal adhesion with a minimum of health and safety hazards in its use.

It is a further object of this invention to simplify the method of rubber to metal adhesion by providing a method by which all types of rubber compounds may be adhered to metallic and similar surfaces.

I have discovered that a rubber may be firmly and tenaciously adhered to a metallic surface by applying a new adhesive cement to a clean metal surface, applying vulcanizable rubber to the adhesive coated surface and vulcanizing the assembly. The adhesive cement used in the method of my invention preferably comprises a solution in a volatile solvent of a mixture consisting of a partially decomposed chlorinated derivative of natural or synthetic rubbers, a partially hypochlorinated derivative of natural or synthetic rubbers, preferably together with a proportion of a crude rubber, and desirably with proportions of certain compounding ingredients such as carbon black or other coloring and reinforcing pigments, age-resistors and the like.

I have further discovered that the partially decomposed chlorinated derivatives and the partially hypochlorinated derivatives of synthetic rubbers may be substituted for the analogous natural rubber derivatives with much the same results and in some instances, for the adhesion of particular synthetic rubbers to metal, the adhesives made from certain synthetic rubber derivatives give particularly satisfactory results.

The chlorinated rubber derivatives used in the invention may be any of the derivatives containing 65 percent or more chlorine prepared by any of the known methods such as the derivatives formed by passing gaseous chlorine into a dilute solution of rubber. The partially decomposed chlorinated rubber derivatives (component A herein), used in the invention are the products formed when a fully chlorinated rubber derivative of 65 percent or more chlorine is treated so as to remove a small proportion of chlorine. This partial decomposition may be accomplished in a number of ways, for example, by passing gaseous ammonia into a solution of the chlorinated rubber for a time sufficient to remove a small proportion of the chlorine. Similar results may be obtained by treating a solution of the chlorinated rubber derivative with zinc dust or simply by heating the chlorinated rubber solution at elevated temperatures in the absence of a chemical reagent to react with the chlorine. Equally good results have been obtained by milling the solid chlorinated rubber on a heated rubber roll mill for a time sufficient to cause the desired partial decomposition. Still other methods of producing the partially decomposed chlorinated rubber derivatives are possible.

The partially hypochlorinated rubber derivatives used in the invention are the products (henceforth called component B herein) formed in any manner known to the art as by adding a cold hypochlorous acid solution to a solution of a rubber in an inert organic solvent. If the hypochlorination reaction is carried to completion or saturation, a rubber derivative is obtained having a chlorine content of approximately 30 percent. Such a derivative is hard and resin-like, while the partially hypochlorinated rubber derivative of the invention is a hypochlorinated derivative obtained by stopping the hypochlorination reaction somewhat before completion and while the derivative still retains some of its rubber-like properties.

The crude rubber used in the invention is preferably the same rubber material from which one or both of the main components of the cement has been made. However, similar results may be obtained by adding other crude rubbers or mixtures of crude rubbers if desired.

The adhesive cement of this invention is made by adding the rubber derivatives, the crude rubber, and the desired compounding ingredients to a sufficient quantity of a volatile solvent to make a solution of proper consistency as for application by brushing or spraying.

In order that the invention may be better understood, reference should be had to the accompanying drawing. Fig. 1 is an elevation in section, showing a layer of a rubber composition, natural and/or synthetic, adhered to a rigid base member by a layer comprising a mixture of a partially dechlorinated chlorinated rubber (component A hereinabove) and a partially hypochlorinated rubber (component B). Fig. 2 is a similar elevation in section, showing a layer of natural and/or synthetic rubber adhered to a steel base member by an adhesive comprising a mixture of a partially dechlorinated chlorinated rubber and a partially hypochlorinated rubbery polychloroprene. Fig. 3 represents still another manner of adhering a vulcanizable rubber composition to a rigid base member wherein a rigid base member such as steel is provided first with a layer of an adhesive comprising a mixture of a partially dechlorinated chlorinated rubber and a partially hypochlorinated rubbery polyisoprene, then a layer of gum rubber is superimposed on the adhesive layer and finally a layer of a vulcanizable rubber composition is placed over the already-coated member and the various layers united by vulcanizing the resultant assembly. The relative thicknesses of the rubber layers and of the base members and the disposition of the same shown in the drawing are chosen only to illustrate the invention and are not intended as a limitation thereon.

The invention will now be described with further particularity with reference to a number of specific examples.

EXAMPLE I

Component A

This component, a partially decomposed chlorinated rubber derivative of natural rubber, was prepared as follows:

500 grams of a chlorinated natural rubber derivative (65% chlorine) were dissolved in 2500 grams of benzene. Anhydrous ammonia, in gaseous form, was passed into the solution for approximately four hours at 25 degrees centigrade. The solution was then heated to 75 to 80 degrees centigrade to expel excess ammonia. The dried product contained about 59 percent chlorine.

Component B

This component was a partially hypochlorinated natural rubber derivative prepared as follows:

50 grams of powdered calcium carbonate were suspended in one liter of ice water. Chlorine gas was introduced into the stirred and well cooled suspension for a period of 15 minutes. Unreacted calcium carbonate was removed by filtration and 400 c. c. of the filtrate were added with stirring to 200 grams of a 5 percent solution of rubber in toluene. The partially hypochlorinated rubber was isolated by drowning the mixture in ethyl alcohol. The dried product contained about 5.2 percent chlorine.

An adhesive mixture was made by adding 6 parts of component A, 1 part of component B, and 0.5 part of a mixture of rubber and carbon black (in equal proportions by weight) to a sufficient quantity of xylene to give a concentration of 20 percent solids. The mixture gave excellent adhesion of both pure gum and carbon black compounds of natural and synthetic rubbers to steel. For example, the following rubber compound is a typical natural rubber carbon black-containing compound which may be firmly and tenaciously adhered to a metal by the method of this invention:

| Ingredient: | Parts by weight |
|---|---|
| Smoked sheet | 200.0 |
| Mercapto benzothiazole | 0.6 |
| Mercapto benzothiazyl disulfide | 1.2 |
| Diortho tolyl guanidine | 0.2 |
| Sulfur | 4.0 |
| Carbon black | 112.0 |
| Softening oil | 10.0 |
| Stearic acid | 1.0 |
| Zinc oxide | 6.0 |
| Age resistor | 3.0 |

Cure: 30 min. @ 292° F. in a conventional press.

EXAMPLE II

Component A

This component, a partially decomposed chlorinated derivative of natural rubber, was prepared as follows:

50 grams of chlorinated rubber (65 percent chlorine), 100 grams of xylene, 4 grams of dibutyl phthalate, 20 grams of carbon tetrachloride, and 26 grams of dipentene were stirred together until the chlorinated rubber was dissolved. The solution was then heated at 95° centigrade for 2 hours. The product contained approximately 60 percent chlorine.

Component B

This component, a partially hypochlorinated derivative of natural rubber, was prepared as follows:

150 grams of bleaching powder (composed of calcium hypochlorite and inert ingredients) were added to 2 liters of ice and water. The mixture was acidified with carbon dioxide gas, and the whole suspension was filtered. 1200 c. c. of the ice-cold filtrate were added to 2,000 grams of a 5 percent solution of rubber in chloroform. The resulting emulsion was stirred for three hours, and the rubber derivative was precipitated by drowning in ethyl alcohol. The product was washed and dried under vacuum at room temperature. The final product was found to have a chlorine content of 7.4 percent.

An adhesive cement was made as follows:

21 grams of component B, 7 grams of pale crepe rubber, 9.8 grams of channel black were milled on a roll mill and the milled mixture dispersed in 200 grams of xylene, 100 grams of carbon tetrachloride and 32 grams of dipentene. 6.5 grams of this latter solution were mixed with 2.5 grams of component A in solution and stirred. The adhesive cement gave excellent adhesion of both natural and GRS-3 (a polymer of 75 parts butadiene and 25 parts styrene) carbon black containing tread compounds to sand blasted steel. A typical GRS-3 carbon black compound which may be adhered to steel by the method of the invention is as follows:

| Ingredients: | Parts by weight |
|---|---|
| GRS-3 | 200.0 |
| Accelerator | 2.0 |
| Diphenyl guanidine | 0.3 |
| Sulfur | 4.0 |
| Carbon black | 123.0 |
| Softener | 10.0 |
| Stearic acid | 1.0 |
| Zinc oxide | 6.0 |
| Age resistor | 3.0 |

Cure: 30 minutes @ 292° F. in a conventional press.

EXAMPLE III

Component A

This component, a partially decomposed chlorinated derivative of natural rubber, was prepared as follows:

100 grams of a chlorinated rubber derivative (65 percent or more chlorine) were plasticized with 40 grams of diethylene glycol butyl ether acetate on a hot roll mill at 260° F. 10 grams of carbon black were milled in and the mass milled at 260° F. for 10 minutes. The high temperature and the mastication is sufficient to remove a small proportion of the chlorine, the final product containing approximately 61 percent chlorine.

Component B

This component was a partially hypochlorinated natural rubber derivative as prepared in Example II above.

An adhesive cement was prepared by mixing 20 grams of component B with 12.5 grams of a rubber compound composed of 40 parts of pale crepe rubber and 60 parts of carbon black. 20 grams of this mixture were added to 80 grams of component A and 13 grams of acetonyl acetone, 40 grams of carbon tetrachloride, and 180 grams of xylene. The adhesive mixture so produced, when painted on blasted metal before molding, gave excellent adhesion of all kinds of rubber compounds to the metal including the types described above and in addition gave particularly good results with the natural gum rubber compound of the type given below:

| Ingredients: | Parts by weight |
|---|---|
| Latex crepe rubber | 44.25 |
| Crepe rubber | 45.00 |
| Zinc oxide masterbatch (80% Zno) | 1.25 |
| Tuad masterbatch (95% rubber) | 6.00 |
| Rosin oil | 0.50 |

Cure: 30 minutes @ 292° F. in a conventional press.

EXAMPLE IV

Component A

This component was made as follows:
A chlorinated rubber (65% chlorine) was milled on a double roll mill for about 5 minutes at a temperature of 260° F. The final product contained approximately 63 percent chlorine.

Component B

This component, a partially hypochlorinated natural rubber derivative was prepared as follows:

200 c. c. of a "bleach" solution was made by passing chlorine gas into an ice cold solution of sodium hydroxide and then acidifying with carbon dioxide (small pieces of dry ice). The solution was diluted to one liter by the addition of water and added to a rubber solution made by dissolving 90 grams of rubber (masticated 15 minutes on a rubber mill) in 1410 grams of benzene. The resulting emulsion was stirred for ½ hr. and then drowned in about 2.5 times its volume of ethyl alcohol. The derivative was precipitated in small particles which were coagulated into a mass by acidifying with dilute hydrochloric acid to a pH of 5. The product was dried and found to contain 7.59% chlorine. An organic age-resistor was milled into the derivative in the amount of 0.5 part per hundred parts of rubber derivative.

An adhesive cement was prepared by the procedure of Example III and found to give excellent adhesion of a wide variety of rubber compounds of steel.

EXAMPLE V

Component A

This component was a partially decomposed chlorinated derivative of natural rubber as prepared in Example IV above.

Component B

This component is a partially hypochlorinated derivative of natural rubber prepared as in Example IV except the emulsion resulting from the hypochlorination step was broken by adding calcium chloride as a dehydrating agent. After stirring for about ½ hour the clear xylene solution of partially hypochlorinated rubber was separated and used in the preparation of the adhesive cement without separation of the rubber derivative. Excellent adhesion of rubber compounds to steel was obtained.

EXAMPLE VI

Component A

This component was prepared as was the partially decomposed chlorinated rubber of Example I.

Component B

This component was prepared as was the partially hypochlorinated rubber of Example IV except that the hypochlorination was carried forward until the finished derivative contained approximately 14 to 15% chlorine.

An adhesive prepared as in Example III may be used to adhere rubber to metal in the manner indicated.

EXAMPLE VII

Component A

This partially decomposed chlorinated rubber derivative was made as in Example I except the conditions were more rigorous and the reaction was continued until the final product contained 57% chlorine.

Component B

This partially hypochlorinated natural rubber derivative was prepared as in Example IV.

The preparation of the adhesive was substantially the same as in Example III. Good adhesion of carbon black stocks to sand blasted steel was obtained with this adhesive.

EXAMPLE VIII

Component A

This component is a partially decomposed chlorinated derivative of a rubbery polymer (75% butadiene-1,3 and 25 parts styrene). The original chlorinated polymer contained 58% chlorine and after milling on a rubber roll mill for 5 minutes at 260° F. the partially decomposed derivative contained about 54% chlorine.

*Component B*

This component is a partially hypochlorinated natural rubber derivative prepared substantially as in Example II above.

The adhesive cement composition was made by mixing 26 grams of component A, 5 grams of component B and 35 grams of a rubber stock containing 40 parts natural rubber and 60 parts carbon black with 70 grams of xylene, 3 grams of diethylene glycol butyl ether acetate, and 3 grams of acetone. The mixture was a good rubber to metal adhesive.

EXAMPLE IX

*Component A*

This component was obtained from a chlorinated neoprene (a polychloroprene type of synthetic rubber) containing 70% chlorine by heat treating as in Example VIII. The final product contained 65–66% chlorine.

*Component B*

This component was a particularly hypochlorinated derivative of natural rubber prepared substantially as in Example VIII above.

The adhesive mixture was prepared from the above components by much the same procedure as in Example VIII and it was found to be a good rubber to metal adhesive.

EXAMPLE X

*Component A*

This component is a heat-treated chlorinated neoprene (polychloroprene) similar to that in Example IX.

*Component B*

This component was a partially hypochlorinated polyisoprene derivative. Preparation was as follows: 300 grams of bleaching powder in 4 liters of ice and water were neutralized by introducing carbon dioxide. The whole suspension was filtered, and 800 grams of the filtrate were added to 1,000 grams of a 6% solution of polyisoprene in benzene at 25° C. with stirring. The rubber derivative was precipitated by pouring the mixture into ethyl alcohol. The product was washed on a wash mill and dried at 40° C. The dried product contained about 7% chlorine.

A mixture was made of 26 grams of component A, 5 grams of component B, 25 grams of a stock containing 100 parts of a polymer (butadiene-1,3 75 parts, styrene 25 parts) and 40 parts carbon black, 87 grams of xylene, 5 grams of diethylene glycol butyl ether acetate, and 8 grams of acetone. The adhesive gave good adhesion of GRS (butadiene-styrene) polymers and neoprene (polychloroprene) compound to blasted steel.

EXAMPLE XI

*Component A*

This component was a heat-treated chlorinated derivative of polychloroprene (neoprene) prepared as in Example IX.

*Component B*

This component was a partially hypochlorinated derivative of polychloroprene containing about 42% chlorine and was prepared by a procedure closely similar to the partially hypochlorinated polyisoprene of Example X except a different solvent for the polychloroprene was necessary.

An adhesive was prepared with a procedure and proportions substantially the same as in Example X above. The adhesive cement so prepared was an excellent adhesive for the adhesion of neoprene (polychloroprene) stocks to steel and a good adhesive for the adhesion of butadiene-styrene (GRS-3) stocks to steel.

EXAMPLE XII

*Component A*

This component, a partially decomposed chlorinated derivative of natural rubber, was prepared substantially as the component A of Example IV.

*Component B*

This component, a partially hypochlorinated derivative of polyisoprene, was prepared substantially as component B of Example X.

An adhesive cement was prepared by a procedure similar to that in Example III. The adhesive so prepared gave excellent adhesion of natural and synthetic rubber carbon black compounds to steel and in addition was very useful in adhering gum rubber stocks to metal.

The adhesive cements of the above examples and other cements to be made according to this invention, may be used with or without secondary rubbery cements and/or intervening gum rubber layers. Extremely good adhesion of all kinds of rubber stocks has been secured with the use of the adhesive cement of this invention alone but it is conceivable that in some instances it may be advantageous to use a coating of plain rubber cement or an intervening layer of gum rubber.

The partially decomposed chlorinated rubber derivative (component A herein) may contain various amounts of chlorine. A fully chlorinated rubber derivative containing 65% or more chlorine does not produce an adhesive exhibiting good adhesion to metal. However, when a small proportion of chlorine perhaps ½, 1, 1½ or 2 percent or more is removed from the fully chlorinated rubber derivative, the property of rubber to metal adhesion is observed. Excellent rubber to metal adhesion is obtained by the use of adhesives containing partially decomposed chlorinated rubber derivatives of progressively lower chlorine contents, but, when the chlorine content of the partially decomposed chlorinated rubber derivative reaches or goes below 50 to 55 percent gelling of the solution is apt to take place and the value of the adhesive cement is destroyed. It will be appreciated that the chlorine content at which gelling is apt to occur is not a sharp or definite point but is rather indefinite and dependent upon several variables which are not yet fully understood. The chlorine range of 50–55 is a region of instability, for instance a partially decomposed chlorinated rubber derivative may be prepared with 50–55% chlorine and no difficulty with gelling observed, but when compounded into the adhesive of this invention gelling is apt to occur upon standing.

The partially hypochlorinated rubber derivative (component B herein) may also contain various amounts of chlorine. A partially hypochlorinated rubber derivative containing a few percent chlorine is soft and tacky, being much like the crude rubber in properties. As hypochlorination progresses the derivative becomes less soft and less tacky until at a chlorine content of approximately 30% the derivative is hard, tough and resinlike. I have found that the rubber to metal adhesion of the adhesive first increases and then begins to drop off as the chlorine content of component B is increased. A partially hypochlorinated rubber of less than 3 percent chlorine does not appreciably increase the adhesive properties of the adhesive cement of this invention. But when component B contains 3 to 5% or more chlorine a significant improvement in rubber to metal adhesion is noted. Similar adhesion is noted when component B contains 7, 10, 12 and even 15 percent chlorine. A decrease in adhesive properties of the cement is observed when component B contains more than about 15% chlorine.

The two rubber derivatives described above may be made of any rubbery material possessing, when unvulcanized, a structure made up of predominately linear, long carbon chains comprising a multiplicity of intra-chain carbon to carbon double bonds, including specifically natural rubber, gutta percha, balata, latex rubber, guayule, artificial rubber isomers, polyisoprene, neoprene (polychloroprene), polybutadiene, polypiperylene, Nipol (butadiene-1,3-acrylonitrile) GRS and Nitred (butadiene-1,3-styrene), and in addition other polymers of butadiene-1,3 and its homologs with materials copolymerizable therewith such as acrylonitrile, styrene, methyl methacrylate, methyl acrylonitrile, methyl acrylate, isobutylene and other copolymerizable monomeric materials.

The adhesive cement of this invention may contain a minor proportion of a crude rubber, either natural or synthetic including any of the materials enumerated just above and in addition such rubber-like materials as polyisobutylene and the like. The function of the crude rubber appears to be in the nature of a plasticizer for the rubber derivatives and is thought to increase the adhesion of the cement layer to the superposed layer of rubber compound. The proportion of the crude rubber will depend somewhat on the amount and composition of component B as will be discussed below.

The proportions of component A (chlorinated rubber derivative) and component B (partially hypochlorinated rubber derivative) may be varied somewhat. Four parts of component A to one part of component B has been found to give highly satisfactory results though proportions as low as 3 to 1 and as high as 6 to 1 have been used with success. The proportions of components A and B may be varied with the addition of varying proportions of crude rubber and other compounding agents. For instance, if proportions of component A to component B are as much as 6 to 1, sufficient crude rubber may be used so that the proportion of component A to the sum of component B and crude rubber is substantially 4 to 1. I have found that with hydrochlorinated rubbers of low chlorine content, it is not essential to add crude rubber. It will be appreciated, however, that it is to be desried to use a component B having at least 5 to 7 or 10% chlorine (necessitating the admixture of crude rubber) for in this manner the use of component B is decreased, thereby reducing the cost of the adhesive.

The compounding ingredients that may be used are carbon black, coloring pigments, age resistors, and the like. Carbon black of the reinforcing types may be used in wide proportions, the only limitation being the impairment of the adhesion to metal. Carbon black in many instances is a necessary component for the cohesiveness of the adhesive itself should preferably be as high as the cohesiveness of the adhered rubber stock. An organic age-resistor is a desirable component if long service of the composite article is desired but only small proportions of these compounds need be used as is well known in the rubber art. The age-resisting pigments which may be used are phenyl $\beta$ naphthylamine, phenyl $\alpha$ naphthylamine, diphenyl para diphenylamine and the like or mixtures of the above or of any other age resistors known to the art.

The solvents which may be used alone or in combination in an adhesive cement of this invention are xylene, benzene, carbon tetrachloride, chloroform, dipentene and other common solvents for the chlorinated and hypochlorinated derivatives of natural and synthetic rubbers as well as small quantities of acetone, ketones, gasoline, esters such as butyl acetate and alcohols such as methyl and ethyl alcohol. The adhesive of this invention has made possible a simple and economically feasible process of rubber to metal adhesion. With this cement it is possible to adhere both pure gum and carbon black stocks of both natural and synthetic rubbers to metal.

Although especially valuable for adhering rubber to metal, for which the partially dichlorinated chlorinated rubber derivatives appear to have special affinity, the present invention also will be found useful in adhering rubbers to other rigid base members such as wood, hard molded resins, glass and the like.

While the invention has been described with reference to certain specific embodiments and examples, it is not my intention to be limited thereto, for variations and modifications of the invention are possible without departing from the spirit and scope of the invention as defined in the appended claims.

I claim:

1. An adhesive composition comprising from three to six parts by weight of a chlorinated rubber containing from 50 to 66.0% chlorine, said chlorinated rubber being formed by removing at least ½% by weight of chlorine from a fully chlorinated rubber, and one part of a hypochlorinated rubber made by reaction in solution between said rubber and cold hypochlorous acid so as to introduce from 3 to 15% by weight of chlorine into said rubber.

2. An adhesive composition comprising from three to six parts by weight of a chlorinated rubber containing from 55 to 66.0% chlorine, said chlorinated rubber being formed by removing chlorine from a fully chlorinated rubber by heat treatment of said chlorinated rubber in solution so as to remove at least ½% by weight of chlorine therefrom, and one part of a hypochlorinated rubber made by hypochlorinating a rubber to introduce from 5 to 12% chlorine by weight into said rubber.

3. An adhesive composition comprising from three to six parts by weight of chlorinated crude rubber containing from 50 to 64.5% chlorine, said chlorinated crude rubber being formed by heat treating to remove at least ½% chlorine from a reaction product formed by reaction in solution between chlorine atoms and the double-bonded carbon atoms of crude rubber, which reaction product contains at least 65% chlorine principally as chlorine by addition, and a partially hypochlorinated crude rubber in amount one part for every three to six parts of said chlorinated rubber, said hypochlorinated crude rubber containing from three to fifteen percent chlorine, and being formed by reaction in solution between crude rubber and cold hypochlorous acid.

4. An adhesive composition comprising from three to six parts by weight of chlorinated crude rubber containing from 50 to 64.5% chlorine, said chlorinated crude rubber being made by hot mastication to remove at least one-half percent chlorine from a reaction product formed by reaction in solution between chlorine atoms and the double-bonded carbon atoms of crude rubber, which reaction product contains at least 65% chlorine principally as chlorine by addition, partially hypochlorinated polyisoprene in amount one part for every three to six parts of said chlorinated rubber, said hypochlorinated polyisoprene containing from 3 to 15% chlorine and being formed by reaction in solution between polyisoprene and cold hypochlorous acid, and minor proportions of crude rubber.

5. A composite product comprising a layer of a vulcanized rubber composition, a rigid base member, and an intermediate bonding layer comprising from three to six parts by weight of a chlorinated rubber containing from 50 to 66% chlorine prepared by removing at least ½% by weight of chlorine from a fully chlorinated rubber and one part of a hypochlorinated rubber made by hypochlorinating a rubber by reaction in solution between said rubber and cold hypochlorous acid so as to introduce from 3 to 15% by weight of chlorine into said rubber.

6. A composite product comprising a layer of a vulcanized rubber composition, a rigid base member, and an intermediate bonding layer comprising from three to six parts by weight of a chlorinated rubber containing from 55 to 66% chlorine prepared by removing at least ½% by weight of chlorine from a fully chlorinated rubber, and one part of a hypochlorinated rubber made by hypochlorinating a rubber by reaction in solution between said rubber and cold hypochlorous acid to introduce from 5 to 12% chlorine into said rubber.

7. A composite product comprising a layer of a vulcanized rubber composition, a rigid base member, and an intermediate bonding layer comprising from three to six parts by weight of chlorinated rubber containing from 50 to 64.5% chlorine prepared by heat treating fully chlorinated crude rubber containing at least 65% chlorine to remove at least ½% chlorine therefrom, one part of hypochlorinated crude rubber containing from 3 to 15% chlorine prepared by reaction in solution between said crude rubber and cold hypochlorous acid, and minor proportions of crude rubber.

8. A composite product comprising a layer of a vulcanized rubber composition, a layer of steel, and an intermediate bonding layer comprising from three to six parts by weight of chlorinated crude rubber containing from 50 to 64.5% chlorine, said chlorinated rubber being formed by removing at least ½% chlorine from a reaction product formed by reaction in solution between chlorine atoms and the double-bonded carbon atoms of a natural rubber so as to contain at least 65% chlorine, hypochlorinated crude rubber in amount one part of every three to six parts of said chlorinated crude rubber, said hypochlorinated crude rubber containing from 3 to 15% chlorine and being formed by reaction in solution between crude rubber and cold hypochlorous acid.

9. A composite product comprising a layer of a vulcanized rubber composition, a layer of steel, and an intermediate bonding layer comprising from three to six parts by weight of chlorinated crude rubber containing from 50 to 64.5% chlorine, said chlorinated crude rubber being formed by removing at least ½% chlorine from a reaction product formed by reaction in solution between chlorine atoms and the double-bonded carbon atoms of a natural rubber, which reaction product contains at least 65% chlorine, hypochlorinated polyisoprene in amount one part for every three to six parts of said chlorinated crude rubber, said hypochlorinated polyisoprene containing from 3 to 15% chlorine and being formed by reaction in solution between polyisoprene and cold hypochlorous acid.

10. A composite product comprising a layer of a vulcanized rubber composition, a layer of metal, and an intermediate bonding layer comprising from three to six parts by weight of chlorinated polychloroprene containing from 55 to 66% chlorine, said chlorinated polychloroprene being formed by removing at least one-half percent chlorine from fully chlorinated polychloroprene, and hypochlorinated polychloroprene, in amount one part for every three to six parts of said chlorinated polymer, said hypochlorinated polychloroprene being made by hypochlorinating polychloroprene by reaction in solution between said polychloroprene and cold hypochlorous acid so as to introduce from 3 to 15% by weight of chlorine into said polychloroprene.

11. The method of adhering a vulcanizable rubber to a rigid base member comprising coating said member with at least one coat of an adhesive composition comprising from three to six parts by weight of a partially dechlorinated rubber chloride containing from 50 to 66% chlorine and made by removing at least ½% by weight of chlorine from a fully chlorinated rubber, said fully chlorinated rubber being made by chlorination of an unvulcanized rubber, and one part by weight of a partially hypochlorinated rubber made by addition of cold hypochlorous acid to a solution of an unvulcanized rubber so as to introduce from 3 to 15% by weight of chlorine into said rubber, placing a layer of said vulcanizable rubber over said adhesive coated member, and vulcanizing the so-formed assembly.

12. The method of adhering a vulcanizable rubber composition to a metallic surface comprising applying to said surface at least one coating of an adhesive cement comprising a solution in a volatile solvent of from three to six parts by weight of a partially dechlorinated rubber chloride containing from 55 to 66% by weight of chlorine prepared by removing at least ½% by weight of chlorine from a fully chlorinated rubber, said fully chlorinated rubber being prepared by the chlorination of an unvulcanized rubber, and one part by weight of a partially hypochlorinated rubber made by the addition of cold hypochlorous acid to a solution of rubber so as to introduce from 5 to 12% by weight of chlorine into said rubber, placing a layer of said vulcanizable rubber composition over said cement coated surface, and vulcanizing the so-formed assembly.

13. The method of adhering a vulcanizable rubber composition to a rigid base member comprising applying to said member at least one coating of an adhesive cement comprising a solution in a volatile solvent of from three to six parts by weight of a partially dechlorinated rubber chloride containing from 55 to 66% by weight of chlorine and made by heat treatment of a solution of a fully chlorinated rubber so as to remove at least ½% chlorine therefrom, said fully chlorinated rubber being prepared by chlorination of an unvulcanized rubber, one part by weight of a partially hypochlorinated rubber prepared by reaction in solution between a rubber and cold hypochlorous acid so as to introduce from 5 to 12% by weight of chlorine into said rubber, and minor amounts of a crude rubber, placing a layer of said vulcanizable rubber composition over said adhesive-coated member, and vulcanizing the so-formed assembly.

14. The method of adhering a vulcanizable rubber composition to a metallic surface comprising applying to said metallic surface at least one coating of an adhesive cement comprising a solution in a volatile solvent of from three to six parts by weight of a partially dechlorinated rubber chloride containing from 50 to 64.5% by weight of chlorine and prepared by hot mastication of a fully chlorinated rubber so as to remove at least ½% by weight of chlorine therefrom, said fully chlorinated rubber being prepared by chlorination of an unvulcanized rubber, and one part by weight of a partially hypochlorinated rubber containing from 3 to 15% by weight of chlorine prepared by reaction in solution between said rubber and cold hypochlorous acid, placing a layer of said vulcanizable rubber composition in contact with said cement-coated metallic surface, and vulcanizing the so-formed assembly.

15. The method of adhering a vulcanizable rubber composition to a metallic surface comprising coating said surface with at least one coating of an adhesive cement comprising a solution in a volatile solvent of from three to six parts by weight of a partially dechlorinated rubber chloride containing from 50 to 64.5% chlorine and prepared by hot mastication of a fully chlorinated rubber so as to remove at least ½% by weight of chlorine therefrom, said fully chlorinated rubber being made by chlorination of an unvulcanized unatural rubber, and one part by weight of a partially hypochlorinated rubber containing between 3 and 15% chlorine prepared by reaction in solution between an unvulcanized natural rubber and cold hypochlorous acid, placing a layer of said vulcanizable rubber composition over said adhesive-coated metallic surface and vulcanizing the so-formed assembly.

16. The method of adhering a vulcanizable rubber composition to a rigid steel base member comprising coating said member with at least one coating of an adhesive cement comprising a solution in a volatile solvent of from three to six parts by weight of a partially dechlorinated rubber chloride containing from 55 to 66% by weight of chlorine and prepared by hot mastication of a fully chlorinated rubber so as to remove at least ½% chlorine therefrom, said fully chlorinated rubber being prepared by chlorination of an unvulcanized polychloroprene rubber, and one part by weight of a partially hypochlorinated rubber containing from 3 to 15% by weight of chlorine prepared by reaction in solution between an unvulcanized rubber and cold hypochlorous acid, placing a layer of said vulcanizable rubber composition over said adhesive-coated member, and vulcanizing the so-formed assembly.

17. The method of adhering a vulcanizable rubber composition to a steel surface comprising coating said surface with at least one coat of an adhesive cement comprising a solution in a volatile solvent of from three to six parts by weight of a partially dechlorinated rubber chloride containing from 50 to 64.5% by weight of chlorine prepared by hot mastication of a fully chlorinated rubber, said fully chlorinated rubber being prepared by chlorination of an unvulcanized natural rubber, and one part by weight of a partially hypochlorinated rubber containing from 3 to 15% by weight of chlorine prepared by reaction in solution between unvulcanized polyisoprene and cold hypochlorous acid, placing a layer of said vulcanizable rubber composition over said adhesive-coated surface and vulcanizing the so-formed assembly.

JAMES R. SCHAFFER.

REFERENCES CITED

The following references are of record in the file of this patent:

UNITED STATES PATENTS

| Number | Name | Date |
| --- | --- | --- |
| 2,078,910 | Merrill | Apr. 27, 1937 |
| 2,170,947 | Habgood et al. | Aug. 29, 1939 |
| 2,191,748 | Baxter et al. | Feb. 27, 1940 |
| 2,227,991 | Winkelmann et al. | Jan. 7, 1941 |
| 2,262,092 | Buffington | Nov. 11, 1941 |
| 2,323,591 | Gans | July 6, 1943 |
| 2,467,322 | Lightbown | Apr. 12, 1949 |

Certificate of Correction

Patent No. 2,522,135 September 12, 1950

JAMES R. SCHAFFER

It is hereby certified that error appears in the printed specification of the above numbered patent requiring correction as follows:

Column 6, line 16, for the words "of steel" read *to steel*; column 11, line 63, for "of", first occurrence, read *for*; column 13, line 37, for "unatural" read *natural*;

and that the said Letters Patent should be read as corrected above, so that the same may conform to the record of the case in the Patent Office.

Signed and sealed this 17th day of April, A. D. 1951.

[SEAL]

THOMAS F. MURPHY,
*Assistant Commissioner of Patents.*